(12) United States Patent
Kamei et al.

(10) Patent No.: US 6,648,530 B2
(45) Date of Patent: Nov. 18, 2003

(54) LIGHT EMITTING KEYED KEYBOARD

(75) Inventors: Nobuyuki Kamei, Shiga-ken (JP);
Tohru Nakanishi, Moriyama (JP);
Akihiko Kitanaka, Shiga-ken (JP)

(73) Assignee: International Business Machines Corporation, Armonk, NJ (US)

( * ) Notice: Subject to any disclaimer, the term of this patent is extended or adjusted under 35 U.S.C. 154(b) by 0 days.

(21) Appl. No.: 10/085,320

(22) Filed: Feb. 28, 2002

(65) Prior Publication Data

US 2002/0122683 A1 Sep. 5, 2002

(30) Foreign Application Priority Data

Mar. 1, 2001 (JP) ......................................... 2001-056321

(51) Int. Cl.[7] .................................................. B41J 5/28
(52) U.S. Cl. .......................... 400/472; 400/489; 341/22
(58) Field of Search .................. 400/472, 489; 341/22

(56) References Cited

U.S. PATENT DOCUMENTS

| | | | | | |
|---|---|---|---|---|---|
| 4,874,913 A | * | 10/1989 | Aoki et al. | ................. | 200/314 |
| 5,266,949 A | * | 11/1993 | Rossi | .......................... | 200/314 |
| 5,397,867 A | * | 3/1995 | Demeo | ........................ | 200/311 |
| 5,408,060 A | * | 4/1995 | Muurinen | .................... | 200/314 |
| 5,987,890 A | * | 11/1999 | Chiu et al. | ............. | 165/104.33 |
| 6,036,326 A | * | 3/2000 | Yoshikawa et al. | ......... | 200/310 |
| 6,109,039 A | * | 8/2000 | Hougham et al. | ......... | 62/259.2 |
| 6,217,183 B1 | * | 4/2001 | Shipman | ..................... | 200/314 |
| 6,322,229 B1 | * | 11/2001 | Chan et al. | .................... | 362/23 |

* cited by examiner

*Primary Examiner*—Charles H. Nolan, Jr.
(74) *Attorney, Agent, or Firm*—J. Bruce Schelkopf (57) ABSTRACT

As it is often difficult for users of a keyboard to adequately identify and select the correct keys in a keyboard where the light is inadequate, it is desirable to provide a keyboard capable that allows a user to better see keys of the keyboard even in environments where there is not sufficient light to see the keys (e.g., in an airplane). A keyboard of the present invention comprises a substrate, a membrane, an elastic member, a cover sheet, a keytop, and light-emitting means for emitting light from the bottom of the substrate to the keytop. The keytop is illuminated and a legend on a key surface can be seen, so that the chance of incorrect key stroke is reduced.

17 Claims, 10 Drawing Sheets

LIGHT EMITTING KEYED KEYBOARD

BACKGROUND OF THE INVENTION

1. Field of the Invention

The present invention relates to a keyboard for a portable notebook computer capable of seeing keys even in low light conditions.

2. Description of the Related Art

As a notebook computer becomes thinner and lighter, consumers have found that such improvements make it easier to carry to a variety of different locations. Further, there has been a dramatic increase in battery capacity for portable notebooks, thereby allowing users to use a notebook computer for longer periods, often in a continuous format, of time. As a result, the use of a notebook computer in public, in transportation-based environments and outdoors has become more commonplace.

Figure 11:
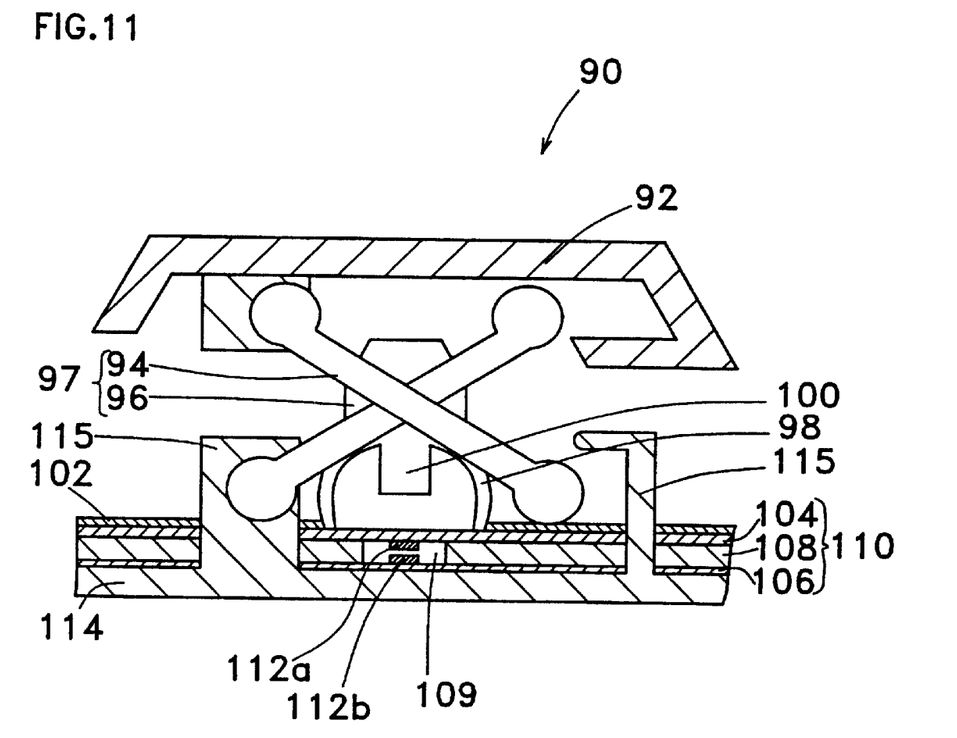

In general, when a keytop 92 of a key 90 on a keyboard of a notebook computer shown in FIG. 11 is pressed, a rubber member 96 is pushed downward with a pantograph 94. When a cup portion 98 of the rubber member 96 is thereby compressed, a protrusion 100 pushes a first contact 112a of an upper polyester film 104 downward, so that the first contact 112a comes in contact with a second contact 112b of a lower polyester film 106. When the two contacts 112a and 112b touch each other, electrical continuity between wirings on the films 104 and 106 is ensured (i.e., the path is conductive) and an electric signal is transmitted to a controller of the keyboard. From the transmitted electric signal, the controller judges which key 90 was pressed.

However, since it is hard for a user to visibly see the keys 90 in a dimly-lit environment, such as in an airplane, it is readily conceivable that a user is likely to make an incorrect key stroke often. As such, in order to overcome these errors, it would be useful to provide a lighting fixture to a keyboard so as to illuminate the keys 90.

For example, Japanese Unexamined Patent Publication No. (Patent Kokai No.) 11-232957 (1999) and 11-282606 (1999) disclose a key input device having a backlight for illuminating a keyboard. These input devices are for an electronic organizer and handy terminal, and comprise a backlight panel on a substrate or a sheet on which contacts and a circuit are formed. However, in the case of a keyboard of a notebook computer, projections 115 of a substrate 114, as in FIG. 11, would need to be inserted into holes bored through polyester films 104 and 106 and spacer 108 so as to keep a membrane 110 in a right position, as shown in FIG. 11. Unlike the aforementioned key input devices, holes cannot be bored into the backlight panel, so that the backlight panel cannot be placed on the membrane 110 to illuminate the keys 90.

As such, it would be desirable to provide a keyboard capable of enabling a user to better see keys in environments where there is typically an insufficient light source to allow normal viewing, such as in an airplane, for example.

SUMMARY OF THE INVENTION

Accordingly, an object of the present invention is to provide a keyboard capable of seeing keys even in environments where there is not sufficient light to see the keys, for example, in an airplane.

A keyboard, according to an aspect of the present invention comprises: a substrate; a membrane having contacts for each key formed on the substrate; an elastic member for each key formed over the contacts of the membrane; a keytop for each key formed over the elastic member; and light-emitting means for emitting light from the underside of the substrate to the keytops, wherein the substrate and the membrane are light transmissive at least at portions corresponding to the top surfaces of the keytops, and the keytops are light transmissive at portions corresponding to legends or non-legend areas of the top surfaces of the keytops.

In another aspect of the present invention, light emitted by the light-emitting means of the keyboard, formed under the substrate, passes through the substrate, membrane and elastic material to the keytops, to thereby provide for each keytop to appear lit.

Similarly, where a film-like circuit board having contacts for each key is used as a substrate for the membrane, light emitted by the light-emitting means formed under the substrate passes through the substrate, circuit board, elastic material, and keytops, such that each keytop appears to glow.

In another aspect of the present invention, the light-emitting means under the substrate can illuminate the keytops, thereby improving the likelihood of a user selecting the desired key such that the chance of an incorrect key stroke is reduced. In addition, the thermoelectric generating element is used as a power supply source for light source of the light-emitting means, so that battery duration is not reduced.

BRIEF DESCRIPTION OF THE DRAWINGS

Other aspects, features, and advantages of the present invention will become more fully apparent from the following detailed description, the appended claims, and the accompanying drawings, in which:

DETAILED DESCRIPTION

Embodiments of the keyboard according to the present invention will be described with reference to the accompanying drawings.

Figure 1:
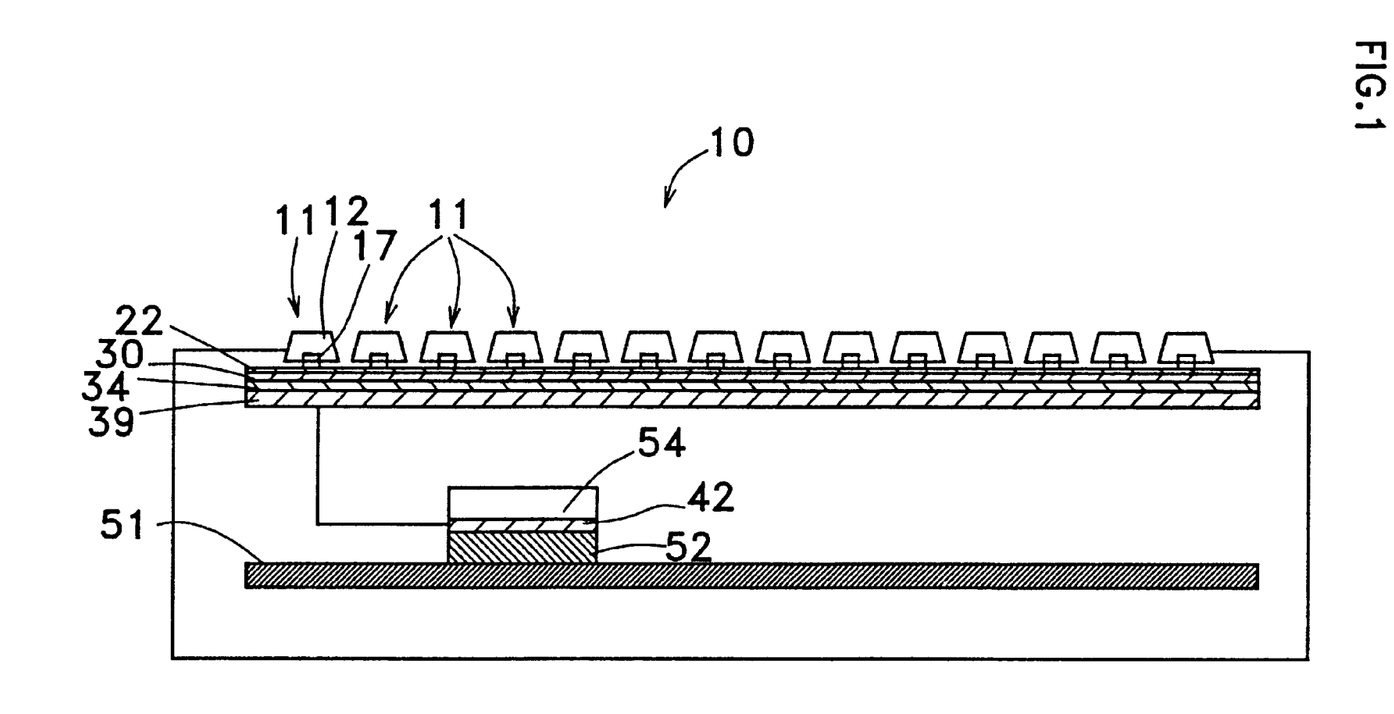
FIG. 1 shows a structure of a keyboard according to an embodiment of the present invention.
Figure 2:
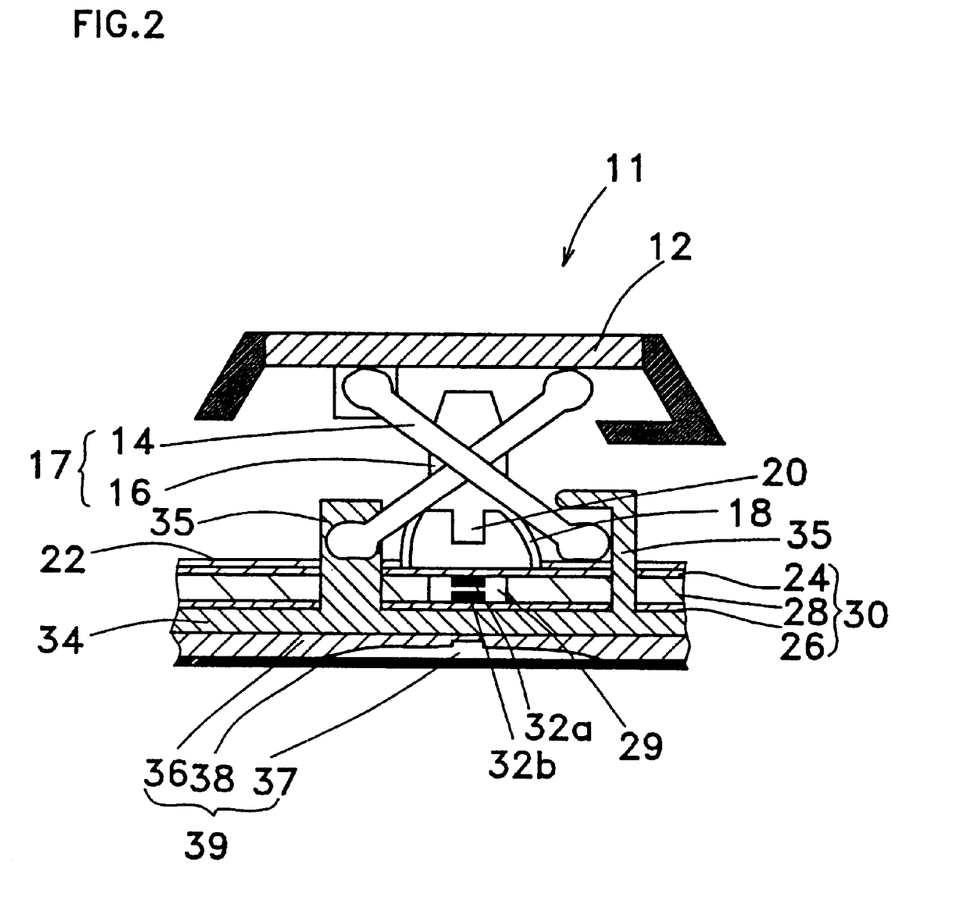
FIG. 2 shows a structure of a key on the keyboard according to an embodiment of the present invention.

As shown in FIGS. 1 and 2, a keyboard 10 of the present invention comprises: a substrate 34; a membrane 30 having contacts 32a and 32b for each key and a circuit, which is formed over the substrate 34; an elastic member 17 for each key formed over the contacts 32a and 32b of the membrane 30; a cover sheet 22 which covers a part of the membrane 30 where the elastic member 17 is not placed; a keytop 12 for each key formed over the elastic member 17; and light-emitting means 39 for emitting light from the underside of the substrate 34 to the keytop 12. The substrate 34 and membrane 30 are preferably made of light transmissive materials. For example, the substrate 34 is made of transparent or translucent acrylic resin or tempered glass. As used herein, a key 11 is preferably composed of the aforementioned keytop 12 and elastic material 17.

The membrane 30 comprises upper and lower light transmissive films 24 and 26 such as polyester film and a light transmissive spacer 28 sandwiched therebetween. On the films 24 and 26, contacts 32a and 32b for each key and a circuit are formed of a conductive material such as conductive ink and the contacts 32a and 32b faces each other in a hollow 29 of the spacer 28. The conductive ink is preferably light transmissive, but it does not have to be light transmissive when the contacts 32a and 32b and the circuit are too fine to block the optical path of light for illuminating the keytop 12.

The elastic material 17 is preferably composed of a rubber member 16 and a pantograph 14. The keytop 12 is supported by the pantograph 14. Therefore, whichever part of the keytop 12 is pressed, the keytop 12 is pushed straight down. When the keytop 12 is pressed, a rubber member 16 is pushed downward with a pantograph 14. A cup portion 18 of the rubber member 16 is thereby compressed, and a protrusion 20 pushes the contact 32a of the upper film 24 downward. Then the contact 32a comes in contact with the contact 32b of the lower film 26. When a finger is moved off the keytop 12, the rubber member 16 and the pantograph 14 generally revert to the original position, and the contact 32a moves away from the contact 32b. The substrate 34 and membrane 30 are preferably made of light transmissive materials. However, they do not need to be light transmissive in their entirety but may be light transmissive at least at portions corresponding to the top surfaces of the keytops where legends are given.

The pantograph 14 and rubber member 16 constituting the elastic member 17 are also preferably made of light transmissive materials but may not necessarily be light transmissive if they allow sufficient light transmission to provide acceptable legend readability because of their small size or structure. The cover sheet 22 may be light transmissive in its entirety or locally at portions corresponding to the top surfaces of the keytops. Alternatively, since the cover sheet 22 includes openings in which the rubber members 16 are placed, the cover sheet 22 may be opaque if the elastic member 17 is such as not to block light transmission through the openings.

Figure 3A:
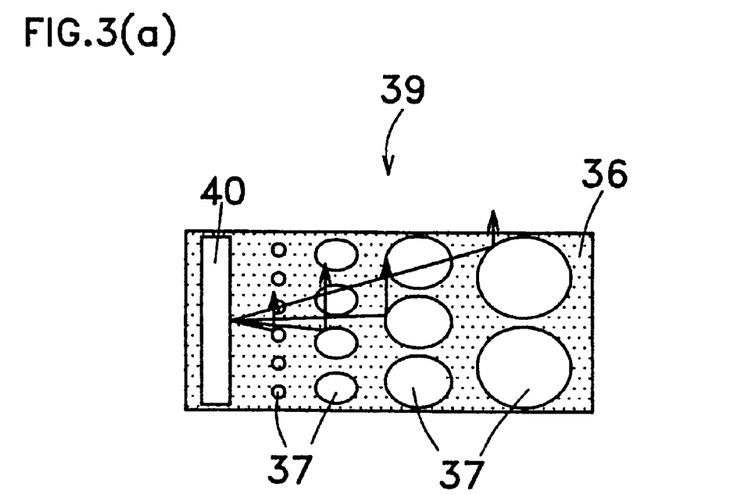
FIGS. 3(a) and 3(b) present a top view and a side view, respectively, of a backlight sheet used in the keyboard according to an embodiment of the present invention.
Figure 3B:
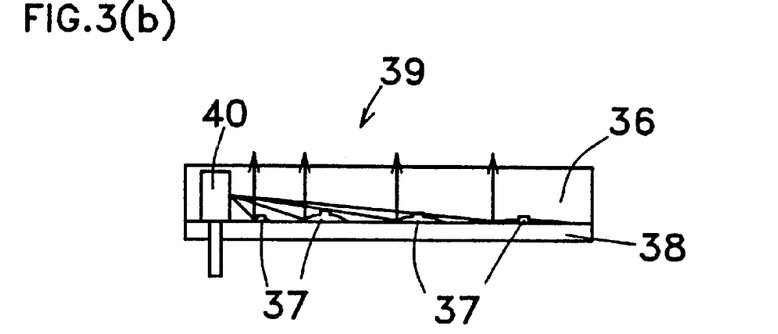

As shown in FIGS. 3(a) and 3(b), the light-emitting means is a backlight sheet 39 composed of a light source 40, a light-guiding plate (light-guiding member) 36 for guiding light from the light source 40 in the direction shown by an arrow, a reflective sheet 38 for reflecting light, and diffusion layers 37 for diffusing light which is formed integral with the light-guiding plate 36. The light source 40 may be a light-emitting diode or a fluorescent light. The diffusion layers 37 are circular in shape, and the sizes thereof increase with distance from the light source 40, as shown in FIG. 3(a).

Although the amount of light decreases with distance from the light source 40, the increasing sizes of the layers 37 enable efficient light diffusion and uniform radiation of light from the surface of the light-guiding plate 36. A plurality of backlight sheets 39 are arranged in accordance with an area of the keyboard 10. Given that the backlight sheet 39 is 60 millimeters long and 20 millimeters wide, an arrangement of backlight sheets 39 in two rows and twelve per row constitutes the same area as the keyboard 11, as shown in FIG. 3(c).

For example, where a keytop 12 is 18 millimeters long and 18 millimeters wide, three keys 11 can typically be arranged on one backlight sheet 39. The backlight sheets 39 are arranged in parallel. For example, a uniform radiation backlight sheet LUB 1000 (available from ROHM CO., LTD) is used as the backlight sheet 39, it operates at 2 V and 0.02 A, and the backlight sheets consume 0.98 watts of power in total.

Figure 3C:
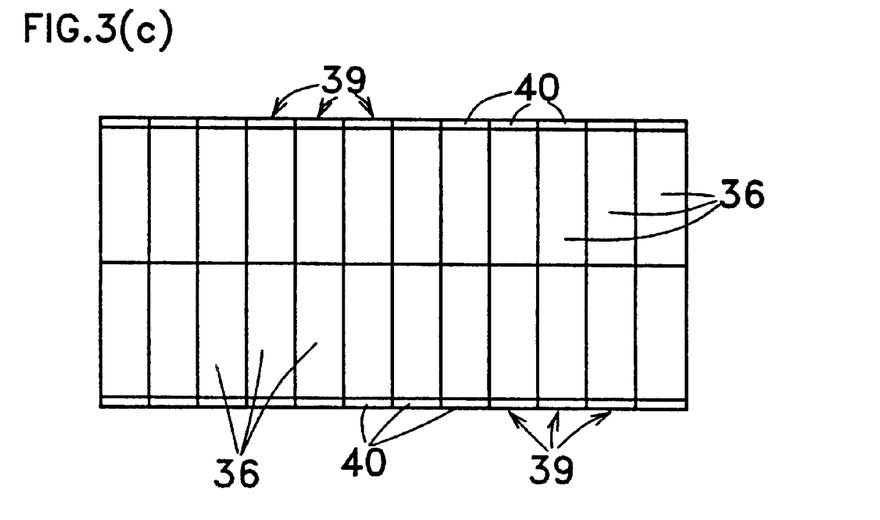
FIG. 3(c) shows a parallel arrangement of the backlight sheets.
Figure 4A:
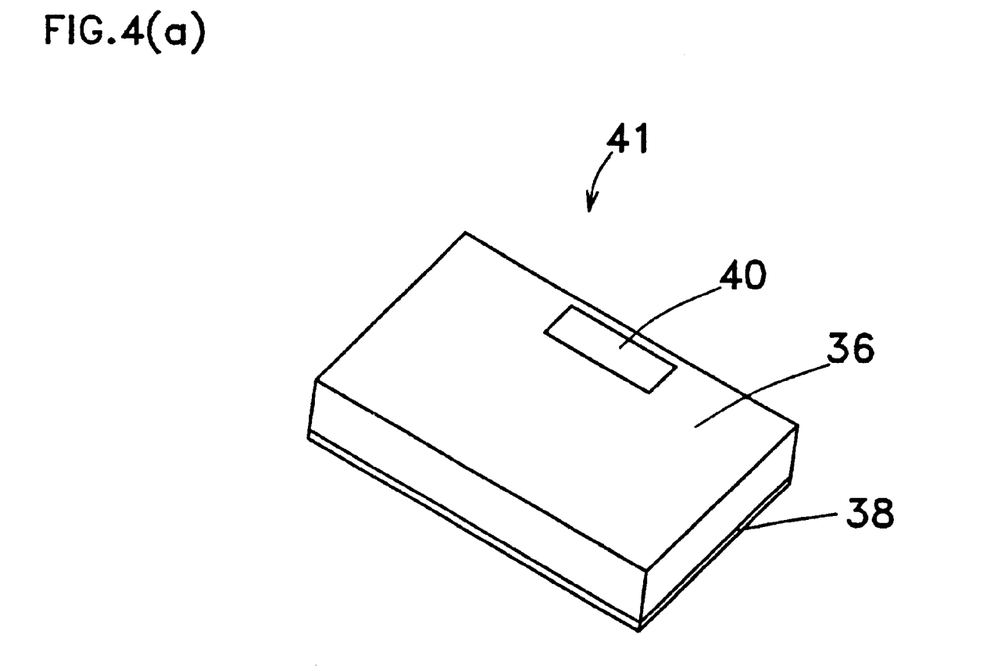
FIG. 4(a) is a perspective view showing another backlight sheet used in the keyboard according to an embodiment of the present invention, and 4(b) shows a parallel arrangement of the backlight sheets.
Figure 4B:
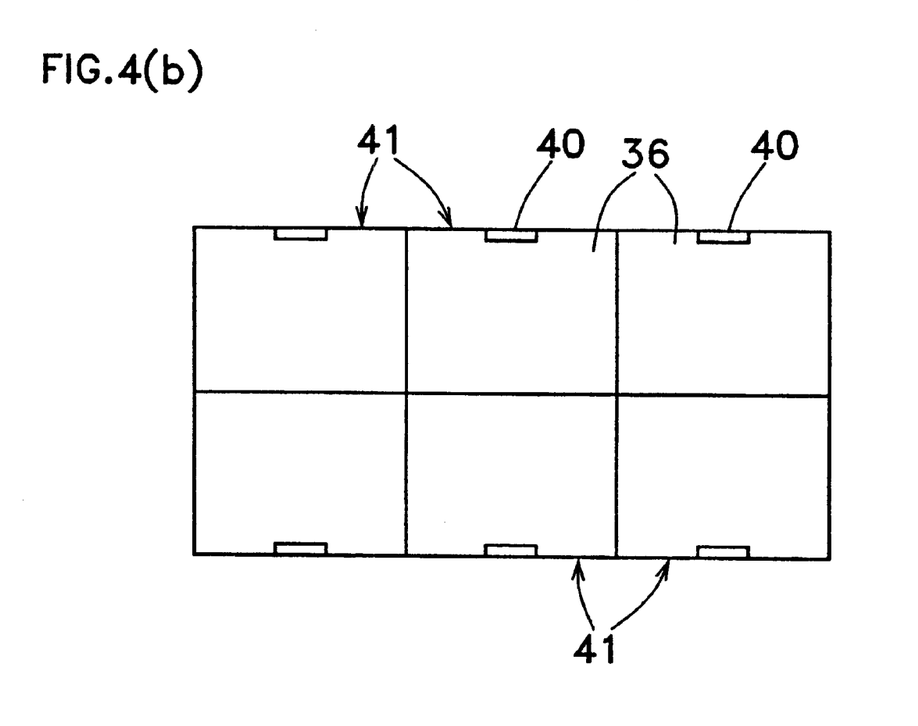

The light source 40 is not limited to the one which is provided throughout the one side of the plate 36, as shown in FIGS. 3(a) to 3(c), but it can be provided partially on the one side of the plate 36, as shown in FIG. 4(a) in the case of large size backlight sheets 41. Such backlight sheets 41 may be arranged in two rows and three per row, as shown in FIG. 4(b). Examples of the backlight sheet include a 4-inch backlight sheet for monochrome LCD (manufactured by OMRON Corporation, for example). This backlight sheet operates at 4 V and 0.02 A, and six backlight sheets 41 consume 0.48 watts of power in total.

Figure 5:
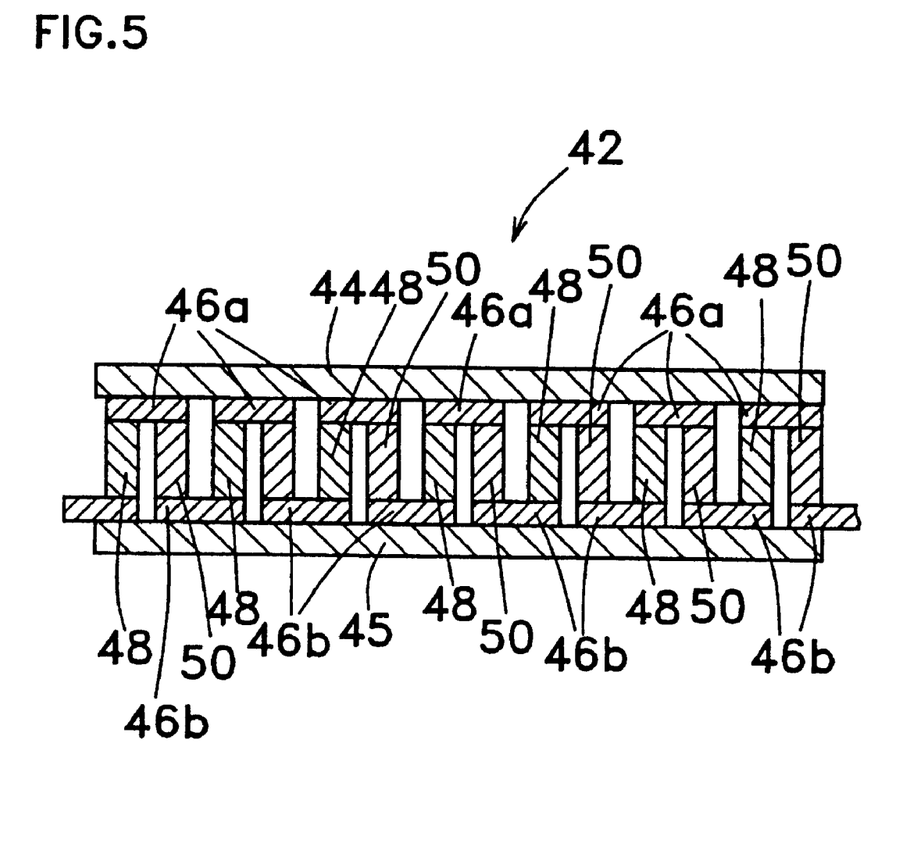
FIG. 5 is a side view of a thermoelectric generating element.

The power for the light source 40 is derived from a thermoelectric generating element 42 shown in FIG. 5. In the element 42, p-type semiconductors 48 and n-type semiconductors 50 are connected in series via electrodes 46a and 46b. When a temperature difference occurs between an upper substrate 44 and a lower substrate 45, a temperature difference also occurs between the electrode 46a connected to the substrate 44 and the electrode 46b connected to the substrate 45. Thus, electromotive force is generated due to the Seebeck Effect. Since a plurality of p-type semiconductors 48 and n-type semiconductors 50 are connected in series via the electrodes 46a and 46b, electromotive force becomes large.

As shown in FIG. 1, the thermoelectric generating element 42 is provided between a micro processing unit (MPU) 52 and a heat sink 54 on a mother board 51 of a notebook computer, and generates electricity using a temperature difference between the MPU 52 and a heat sink 54. The thermoelectric generating element 42 generates electricity to be consumed by the light sources 40 of the backlight sheets 39. In another embodiment of the present invention, instead of the MPU 52, a chip set for controlling data input and output in a notebook computer may be used.

An example of the thermoelectric generating element 42 is a thermoelectric generating element TECI-12705 (available form Fujitaka Co., Ltd., for example), which is capable of generating about 1 watt of power (0.2 Amperes at 5 Volts, 0.5 Amperes at 2 Volts, or 0.25 Amperes at 4 Volts) when a temperature difference is about 10 degree Celsius. This thermoelectric generating element can generate larger electricity than the backlight sheets 39 and 41 consumes, so that no battery of the notebook computer is used. An example of the MPU 52 is a PENTIUM III microprocessor (available from Intel Corporation, for example) and an example of the chip set is a chip set 440BX.

A method of illuminating a keyboard 10 will be described. The MPU 52 generates heat by the use of the notebook computer, and the thermoelectric generating element 42 provided between the MPU 52 and the heat sink 54 generates electricity due to a temperature difference therebetween.

The light source 40 of the backlight sheet 39 emits light using electricity generated by the thermoelectric generating element 42. The light emitted from the light source 40 travels through the light-guiding plate 36, as shown in FIGS. 3(a) and 3(b) by arrows. The light beams traveling through the plate 36 are scattered by the diffusion layer 37.

As shown in FIGS. 3(a) and 3(b), the scattered light beams emanate from the surface of the plate 36 and travel in every direction. Furthermore, the light beams are also reflected by the reflective sheet 38, so that all the light beams are radiated from the surface of the plate 36 into the air. Although only the light source 40 emits light in the backlight sheet 39, the scattered radiation of light beams from the surface of the plate 36 can make the whole of the plate 36 luminous.

Figure 6A:
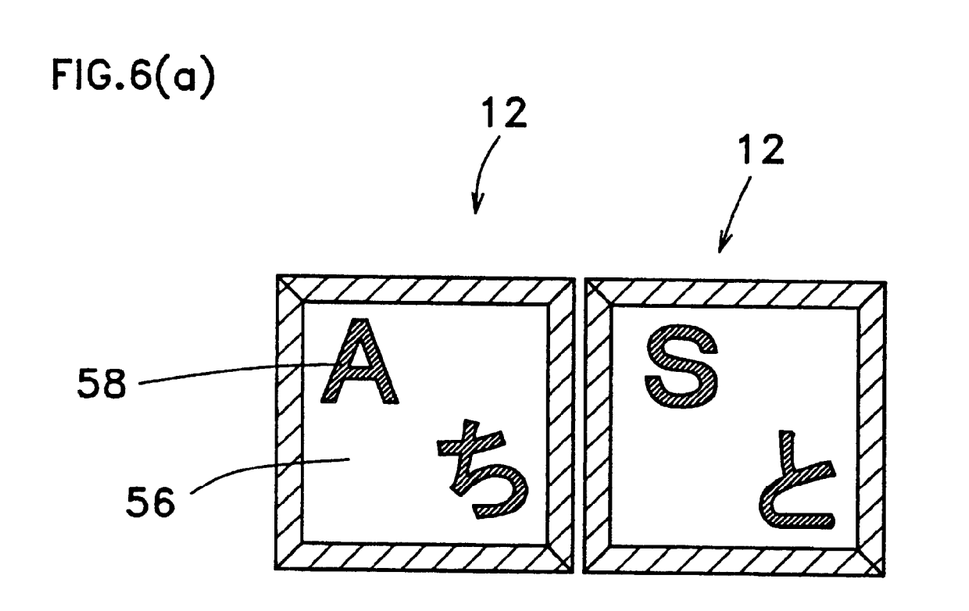
FIG. 6(a) shows a keytop whose surface is made light transmissive.
Figure 6B:
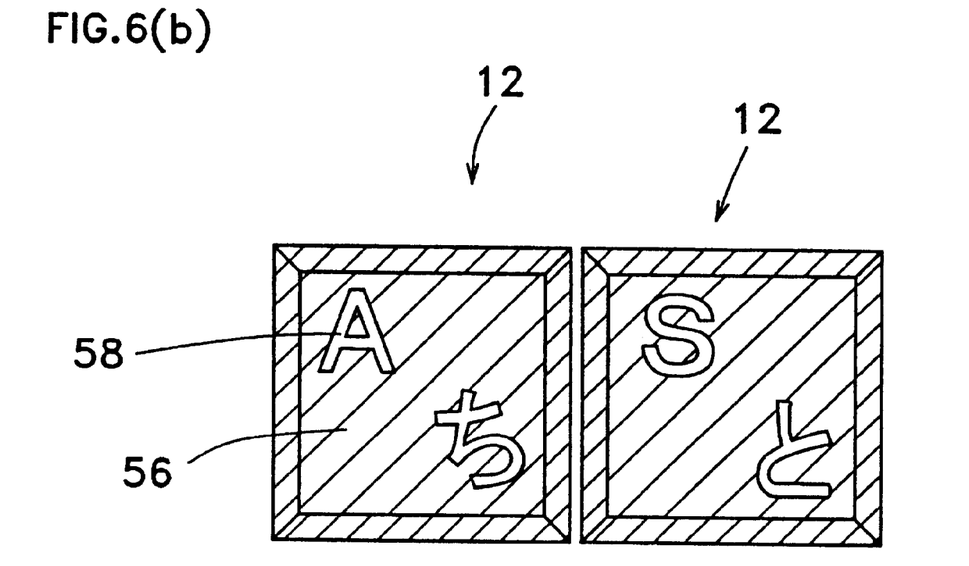
FIG. 6(b) shows another keytop with legends made light transmissive.

Passing through the substrate 34, membrane 30, cover sheet 22, and elastic member 17, the light emanated from the surface of the plate 36 illuminates the keytops 12. The keytops 12 may be made of a resin such as acrylic resin. The keytops 12 are formed so that non-legend areas of top key surfaces 56 are light transmissive as shown in FIG. 6(a) or legends 58 are light transmissive as shown in FIG. 6(b). Therefore, the legends 58 on the keytop 12 can be recognized through the use of light.

In the keyboard 10 of the present invention, the keytops 12 are illuminated by the backlight sheet 39, as described above. Therefore, the keys 11 can be seen even in a dimly-lit environment. Further, the light source 40 of the backlight sheet 39 does not draw power from the battery of a notebook computer but from electricity generated by the thermoelectric generating element 42, so that battery duration is not reduced by the backlight sheet 39.

Figure 7:
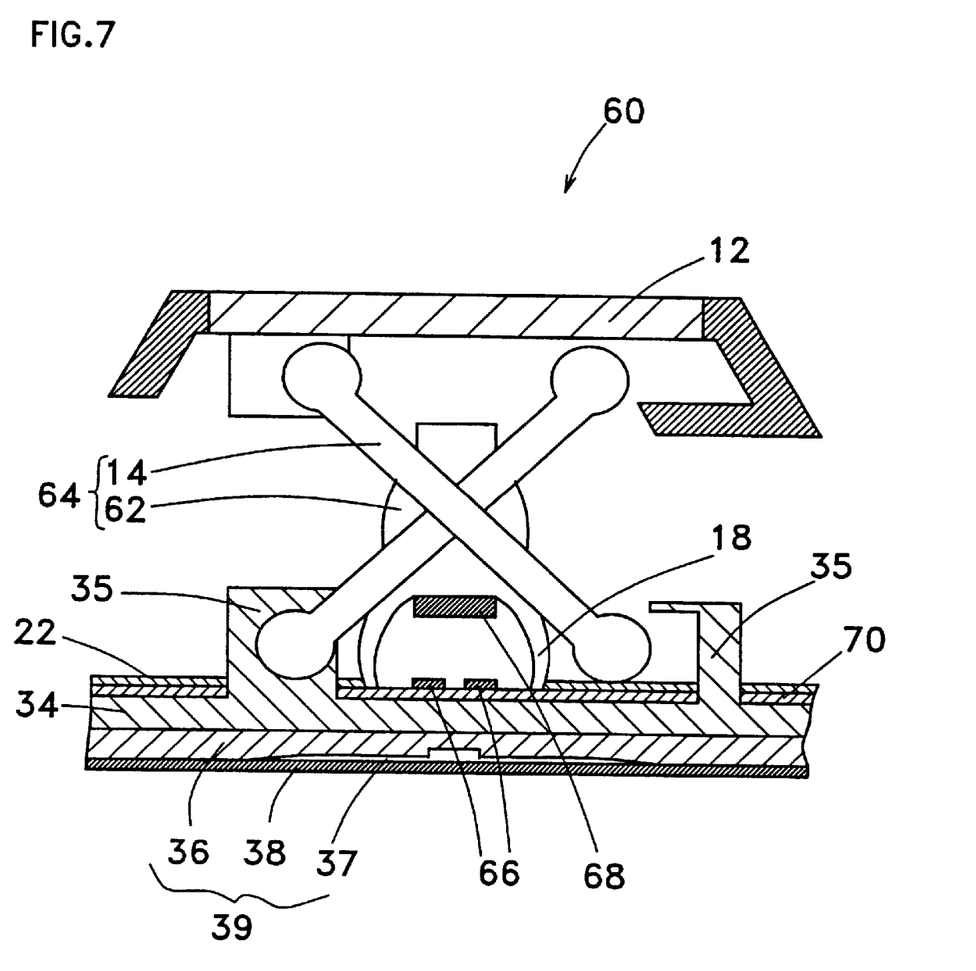
FIG. 7 shows a structure of another key on the keyboard according to an embodiment of the present invention.

As shown in FIG. 7, the aforementioned keyboard 10 may be modified to include an electrically conductive member 68 in the cup portion 18 of the rubber member 62, and a film-like circuit board 70 is used as a substitute for the membrane 30. The key 60 shown in FIG. 7 comprises: a substrate 34; the film-like circuit board 70 having contacts 66 for each key and a circuit, which is formed over the substrate 34; an elastic member 64 for each key which is formed over the contacts 66 of the board 70 and has an electrically conductive member 68 for providing electrically continuity between the contacts 66; a cover sheet 22 which covers a part of the board 70 where the elastic member 64 is not placed; a keytop 12 for each key formed over the elastic member 64; and light-emitting means 39 for emitting light from the bottom of the substrate 34 to the keytop 12. The substrate 34, film-like circuit board 70, and cover sheet 22 may be made of light transmissive materials. The backlight sheet 39 shown in FIGS. 3(a) to 3(c) is used as the light-emitting means 39 in FIG. 7.

Further, the power for the backlight sheet 39 is derived from the thermoelectric generating element 42 shown in FIG. 5.

Passing through the substrate 34, film-like circuit board 70, elastic member 64, and cover sheet 22, the light emanated from the surface of the light-guiding plate 36 illuminates the keytops 12. The keytop 12 is formed so that the top key surface 56 except legends is made light transmissive as shown in FIG. 6(a) or legends 58 are made light transmissive as shown in FIG. 6(b).

As in the case of the aforementioned keyboard 10, the key 60 shown in FIG. 7 can be seen by a user even in a dimly-lit environment. Further, the backlight sheet 39 does not draw power from the battery of a notebook computer but from electricity generated by the thermoelectric generating element 42, so that battery duration of a notebook computer is not reduced by the backlight sheet 39.

Figure 8:
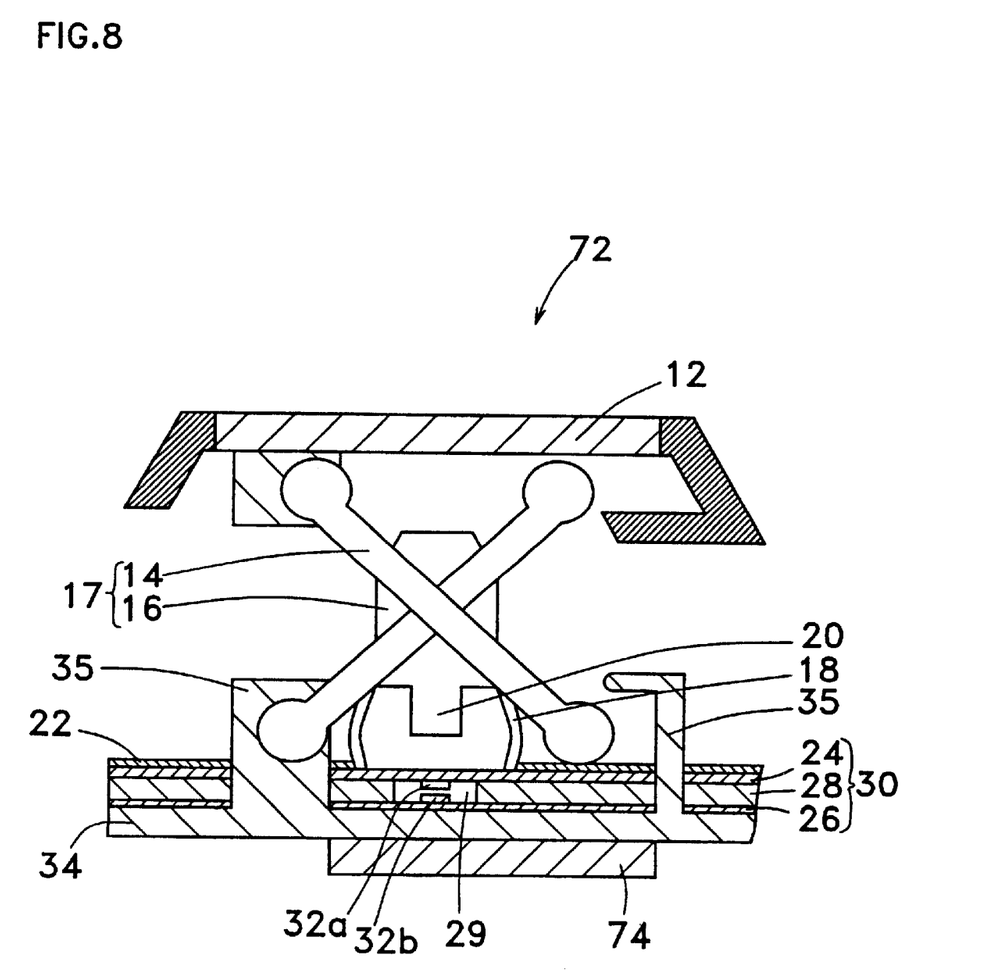
FIG. 8 shows a key in which a light-emitting diode is used as a substitute for the backlight sheet.

While the embodiments of the present invention have thus been described, it should be understood that the present invention can be materialized in other embodiments. For example, as shown in FIG. 8, a light-emitting diode 74 can be provided to each key 72. Further, light from an arbitrary light source can be guided to the bottom of the key 72 through optical fibers to illuminate the keytop 12.

Additionally, luminescent color of the light source 40 is not particularly limited. The color of the keytop 12 may vary depending on the luminescent color of the light source 40 or by the color of the light transmissive material of the keytop 12. When the substrate 34, cover sheet 22 and membrane 30 or circuit board 70 are transparent or translucent in their entirety, there may occur light leakage between the keys 11. Therefore, in order to prevent light leakage between the keys 11, it is preferable to make one or more of them opaque at areas between the keys 11.

Figure 9:
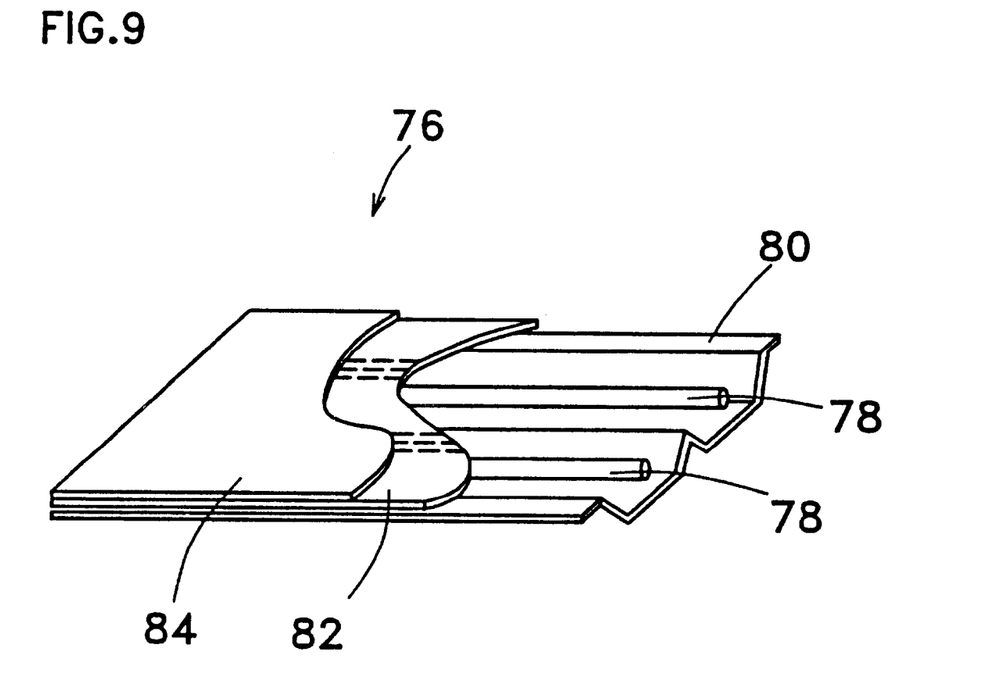
FIG. 9 shows a backlight sheet which can be used as a substitute for the backlight sheet, such as that shown in FIG. 2 or 3.

Further, in addition to backlight sheets 39 and 41 shown in FIGS. 3(a), 3(b), 3(c), 4(a) and 4(b), a backlight 76 such as that shown in FIG. 9 can be also used. In the backlight 76, the light emitted from one or more light sources 78 is uniformly radiated through a lighting curtain 82 and a diffusion sheet 84 which in combination act to produce uniformly distributed light. A fluorescent lump can be used as the light source 78.

Figure 10:
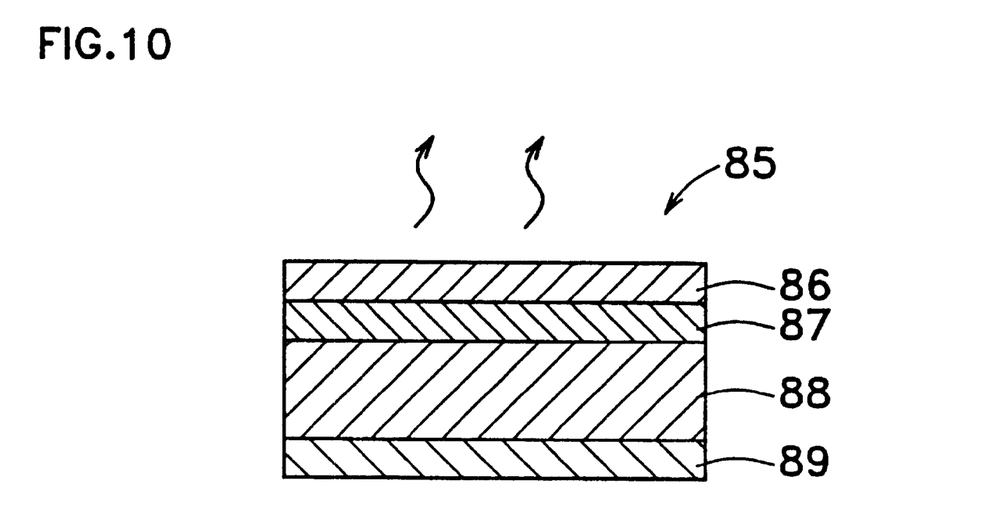
FIG. 10 is a sectional view of an electro luminescence (EL) panel which can be used as another lighting means; and, FIG. 11 shows a structure of a key on a conventional keyboard.

In a further embodiment, an electro luminescence (EL) panel 85 shown in FIG. 10 can be used as another light-emitting means. In the EL panel 85, a fluorescent element 88 is sandwiched between a metal plate 89 and a transparent conductive film 87. The fluorescent element 88 emits light through the application of voltage, and the emitted light is released from the surface of a transparent protective film 86.

In the key 11 shown in FIG. 1, the keytops 12 are always illuminated by the backlight sheet 39. However, when a notebook computer is used in a well-lit area, it is not necessary to illuminate the keytops 12. Therefore, where a notebook computer has a photosensor anywhere therein and is used in a well-lit area, it is possible to stop providing electricity to the light source 40 of the backlight sheet 39. The electricity generated by the thermoelectric generating element 42 can then be used for recharging battery or as a power source to operate various electronic devices.

Alternatively, instead of a photosensor, a software program can be stored in a memory of a notebook computer for controlling light emission and shutoff of the light source 40.

The thermoelectric generating element 42 generates electricity through the use of the Seebeck effect, however, it may serve as a cooling device using the Peltier effect by flowing an electric current. Therefore, when a notebook computer is used in a well-lit area, it is possible to cool the MPU 52 and the chip set using the Peltier effect by flowing a current into the element 42.

Further, where a desktop personal computer has to be used in a dimly-lit environment, a backlight sheet can be placed under a substrate of a keyboard so as to illuminate keytops.

Various changes, modifications and improvements can be made to the embodiments on the basis of knowledge of those skilled in the art without departing from the scope of the invention.

What is claimed is:

1. A keyboard having a plurality of keys, comprising:
a substrate having a membrane formed thereon, wherein said membrane comprises contacts for each key;
an elastic member for each key, formed over the contacts of the membrane;
a keytop for each key, formed over the elastic member; and
light-emitting means for emitting light from the underside of the substrate to illuminate top surfaces of the keytops, wherein the substrate and the membrane are light transmissive at least at portions corresponding to said top surfaces of said keytops, and the keytops are light transmissive at portions in relation to legends or non-legend areas of the top surfaces of the keytops.

2. A keyboard having a plurality of keys, comprising:
a substrate;
a circuit board having contacts for each key, formed over the substrate;
an elastic member for each key, formed over the contacts of the board and having an electrically conductive member for providing electrical continuity between the contacts;
a keytop for each key formed over the elastic member; and
light-emitting means for emitting light from the underside of the substrate to the illuminate top surfaces of keytops, wherein the substrate and the circuit board are light transmissive at least at portions in relation to the top surfaces of the keytops, and the keytops are light transmissive at portions corresponding to legends or non-legend areas of the top surfaces of the keytops.

3. The keyboard according to claim 1, wherein said light-emitting means is a backlight sheet comprising: a light source, a light-guiding member for guiding light from the light source; a reflective sheet for reflecting the light; and a diffusion layer for diffusing the light.

4. The keyboard according to claim 2, wherein said light-emitting means is a backlight sheet comprising: a light source, a light-guiding member for guiding light from the light source; a reflective sheet for reflecting the light; and a diffusion layer for diffusing the light.

5. The keyboard according to claim 3, wherein a plurality of said backlight sheets are arranged in an array.

6. The keyboard according to claim 3, wherein said light from the light source is diffused by the diffusion layer to be applied through the top surface of the light-guiding board to the keytops.

7. The keyboard according to claim 3, wherein said light source is a light-emitting diode.

8. The keyboard according to claim 3, wherein said light source is a fluorescent lamp.

9. The keyboard according to claim 3, wherein power for said light source is derived from a thermoelectric generating element.

10. The keyboard according to claim 9, wherein said thermoelectric generating element is provided between an MPU or a chip set and cooling means for said MPU or said chip set, and electric power is generated due to a temperature difference therebetween.

11. The keyboard according to claim 10, wherein electric power generated by said thermoelectric generating element is used for recharging battery.

12. The keyboard according to claim 10, wherein electric power generated by said thermoelectric generating element is used operating an electronic device.

13. The keyboard according to claim 10, wherein said thermoelectric generating element serves as a cooling device of at least one of the MPU and the chip set.

14. A keyboard having a plurality of keys, configured in combination with a notebook computer, comprising:
a substrate having a membrane formed thereon, wherein said membrane comprises contacts for each key;
an elastic member for each key, formed over the contacts of the membrane;
a plurality of keytops formed over the elastic member, wherein each keytop represents a key on the keyboard; and
light-emitting means comprising a light source for emitting light from the underside of the substrate to illuminate top surfaces of the keytops, and a thermoelectric generating element, wherein the substrate and the membrane are light transmissive at least at portions in relation to top surfaces of said keytops, and the keytops are light transmissive at portions corresponding to legends or non-legend areas of the top surfaces of the keytops.

15. The keyboard in combination with a notebook computer according to claim 14 wherein the light-emitting means further comprises a light-guiding member for guiding light from the light source; a reflective sheet for reflecting the light; and a diffusion layer for diffusing the light.

16. The apparatus of claim 15 wherein the light-emitting means is a flourescent light.

17. The apparatus according to claim 16, wherein power for said light source is derived from a thermoelectric generating element.

* * * * *